US010051635B2

(12) United States Patent
Peterson et al.

(10) Patent No.: US 10,051,635 B2
(45) Date of Patent: Aug. 14, 2018

(54) SYSTEMS AND METHODS FOR TAKING ACTIONS BASED ON WHETHER SECONDARY POWER IS BEING RECEIVED

(71) Applicant: Lenovo (Singapore) Pte. Ltd., New Tech Park (SG)

(72) Inventors: Nathan J. Peterson, Oxford, NC (US); Christopher Miles Osborne, Cary, NC (US); Scott Edwards Kelso, Cary, NC (US)

(73) Assignee: Lenovo (Singopore) Pte. Ltd., Singapore (SG)

( * ) Notice: Subject to any disclaimer, the term of this patent is extended or adjusted under 35 U.S.C. 154(b) by 0 days.

(21) Appl. No.: 15/084,764

(22) Filed: Mar. 30, 2016

(65) Prior Publication Data
US 2017/0289989 A1    Oct. 5, 2017

(51) Int. Cl.
    H04M 1/00      (2006.01)
    H04B 1/38      (2015.01)
    H04W 72/04     (2009.01)
    H04B 3/54      (2006.01)

(52) U.S. Cl.
    CPC ............ H04W 72/048 (2013.01); H04B 3/54 (2013.01); H04W 72/0473 (2013.01)

(58) Field of Classification Search
    CPC ........... H04W 72/048; H04W 72/0473; H04W 52/02; H04B 3/54; H04B 1/3883; H04M 1/0262; H04M 119/08

USPC .................. 455/127.1, 522, 571, 572, 550.1
See application file for complete search history.

(56) References Cited

U.S. PATENT DOCUMENTS

| 9,633,661 B1* | 4/2017 | Typrin ................... G10L 17/22 |
| 2008/0036475 A1* | 2/2008 | Waki .................... A61B 5/0537 |
| | | 324/692 |
| 2008/0184043 A1* | 7/2008 | Tsai ...................... G06F 1/3287 |
| | | 713/300 |
| 2012/0331313 A1* | 12/2012 | Yoshioka ................ G06F 1/263 |
| | | 713/300 |
| 2015/0190078 A1* | 7/2015 | Lisogurski ......... A61B 5/14551 |
| | | 600/324 |
| 2015/0230183 A1* | 8/2015 | Stogaitis ........... H04W 52/0254 |
| | | 455/574 |
| 2015/0277466 A1* | 10/2015 | Yokomizo .......... G05B 19/0426 |
| | | 700/12 |
| 2016/0268833 A1* | 9/2016 | Lee ......................... H02J 50/80 |

* cited by examiner

*Primary Examiner* — Nhan Le
(74) *Attorney, Agent, or Firm* — John L. Rogitz; John M. Rogitz (57) ABSTRACT

In one aspect, a device includes a processor and storage accessible to the processor. The storage bears instructions executable by the processor to determine that power from a secondary power source at least one of is being received and will be received. The instructions are also executable to, responsive to the determination that power from the secondary power source at least one of is being received and will be received, perform a first action regarding operating an apparatus using the secondary power source.

26 Claims, 6 Drawing Sheets

SYSTEMS AND METHODS FOR TAKING ACTIONS BASED ON WHETHER SECONDARY POWER IS BEING RECEIVED

FIELD

The present application relates generally to taking actions based on whether secondary power is being received.

BACKGROUND

As recognized herein, a power outage can lead to undesirable consequences. For instance, a person may have to take immediate action to unplug some appliances so that those appliances are not damaged when the power comes back on. A person may also have to take immediate action so that something relying on an appliance, such as a person relying on a life-supporting appliance, remains unharmed and the appliance remains functional despite the loss of power. As also recognized herein, if the person is not available to take such immediate actions or does not know what actions to take, damage to the appliance itself or things relying on the appliance may ensue.

SUMMARY

Accordingly, in one aspect a device includes a processor and storage accessible to the processor. The storage bears instructions executable by the processor to determine that power from a secondary power source at least one of is being received and will be received. The instructions are also executable to, responsive to the determination that power from the secondary power source at least one of is being received and will be received, perform a first action regarding operating an apparatus using the secondary power source.

In another aspect, a method includes determining, at a device, that power from a secondary power source at least one of is being received and will be received. The method also includes performing, at the device and responsive to the determining that power from the secondary power source at least one of is being received and will be received, a first action regarding operating an apparatus using the secondary power source.

In still another aspect, an appliance at least includes a computer readable storage medium that is not a transitory signal. The computer readable storage medium includes instructions executable by a processor to determine that power from a secondary power source at least one of is being received and will be received, and to perform a first action responsive to the determination that power from the secondary power source at least one of is being received and will be received.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
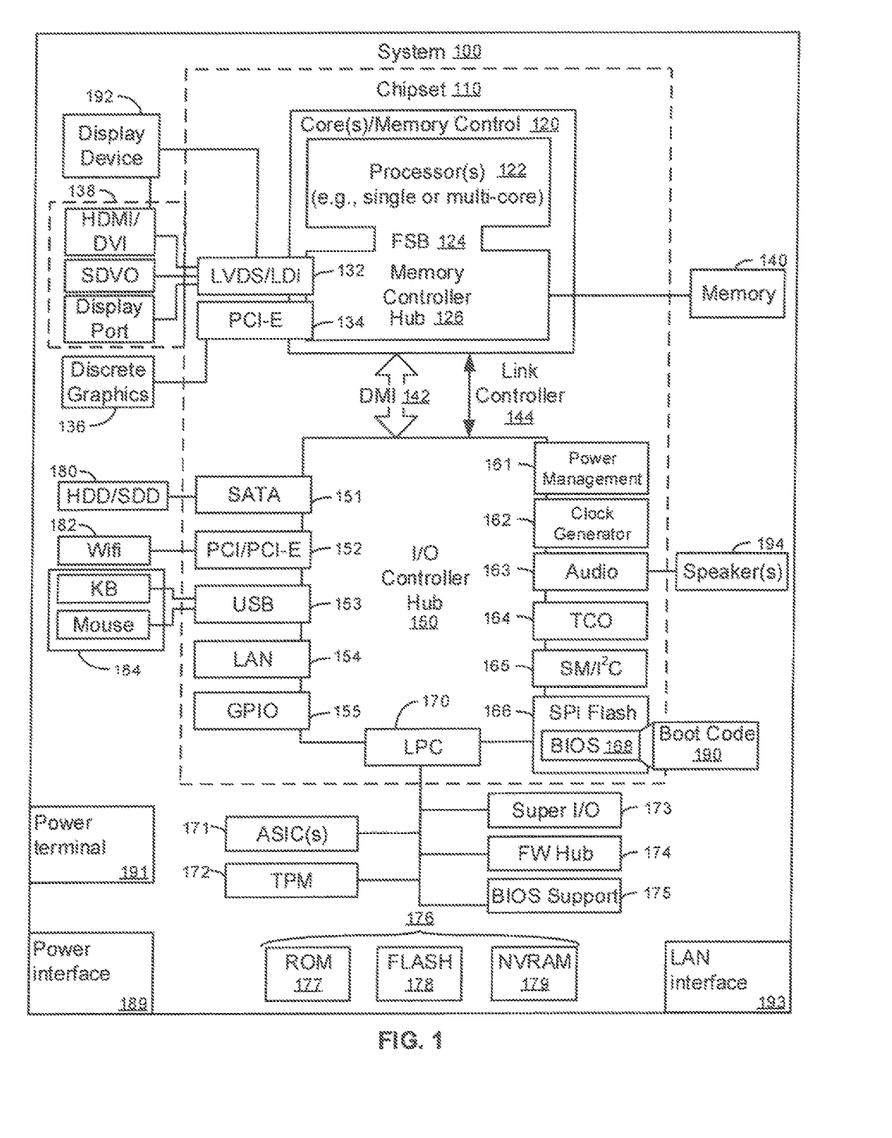
FIG. 1 is a block diagram of an example system in accordance with present principles.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C. or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often inferred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express Interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190.

The power management interface 161 is understood to be configured to manage power or otherwise undertake actions in accordance with present principles, such as reducing power supplied to the system 100 and/or sequencing power supplied to the system 100 between on and off. The power management interface 161 may receive power from a power supply via a power in interface 189 connected to the power supply, and then supply the power to the system 100 and/or a battery (not shown) thereon. In embodiments where, for example, the system 100 is embodied in a smart power outlet to be engaged with electrical structure of a building, the power management interface 161 may be coupled to a power terminal 191 at which another device such as a lamp may be plugged in to receive power via the terminal 191.

With respect to network connections, the I/O hub controller 150 may include integrated gigabit Ethernet controller lines multiplexed with a PCI-E interface port. Other network features may operate independent of a PCI-E interface. The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM)

179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

FIG. 1 also shows that the system 100 may include at least one additional communication interface such as a local area connection (LAN) interface 193. The LAN interface 193 may be a wired and/or wireless LAN interface, where examples of wireless LAN interfaces that may establish the LAN interface 193 include a Wi-Fi transceiver for communicating with other devices in accordance with present principles using Wi-Fi communication protocols, a Bluetooth and/or Bluetooth low energy (BLE) communication element (e.g., a Bluetooth 4.0 communication element) for communicating with other devices in accordance with present principles using Bluetooth communication protocols, and/or a near field communication (NFC) element for communicating using with other devices in accordance with present principles using NFC protocols. However, note that still other communication interfaces may be used for communication with other devices and apparatuses in accordance with present principles. For instance, micro-USB 3.0 communication interfaces may be used, as well as power-line communication interfaces for communicating over power lines using power line communication protocols.

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
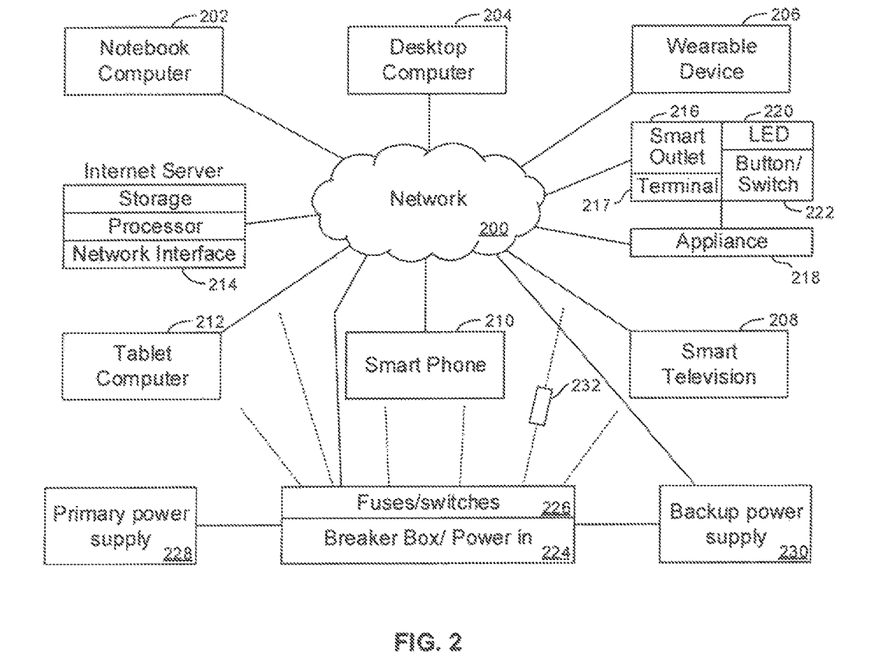
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a smart outlet 216, an appliance 218, and a server 214 such as an Internet server that may provide cloud storage accessible to the devices 202-212, 216, and 218. It is to be understood that the devices 202-218 may be configured to communicate with each other over the network 200 to undertake present principles, though it is to be understood that in some embodiments the appliance 218 may not communicate directly over the network 200 but may be controlled by the smart outlet 216 when engaged therewith based on the smart outlet 216 communicating over the network 200.

Describing the smart outlet 216 is more detail, it may be engaged with and/or electrically coupled to a building in which it is disposed to receive power from a (e.g., primary and/or secondary) breaker/fuse box device(s) 224 and to supply power to an apparatus such as the appliance 218 to which it is electrically coupled. The outlet 216 may include at lease one indicator light or lamp 220, such as a light emitting diode (LED). The outlet 216 may also include at least one button or switch 222 that is manipulate by a user between two positions to configure the outlet 216 to either permit backup power to be supplied through the outlet 216 to an appliance plugged in to the outlet 216 or to not permit backup power to be supplied through the outlet 216 to the appliance (while in either position, for example, still permitting primary power to be supplied to the appliance). Still further, the outlet 216 may include a terminal 217 at which the appliance (such as a lamp, a light, an air conditioning unit, etc.) that consumes power may be connected to thus receive power from the outlet 216 through the terminal 217.

The device 224 may provide power to any or all of the other devices 202-218 as represented by the perforated lines shown, such as when those devices are engaged with respective outlets or interfaces in the building through which power from the device 224 may be received. Thus, it is to be understood that power lines in the building may transmit power from the device 224 to respective outlets with which the other devices 202-218 are engaged. The power lines may also be used to transmit data using power-line communication protocols.

Further, the device 224 may include one or more fuses, circuit breakers, and/or switches 226 for managing and preventing over-supply of power from a power supply to the other devices 202-218 based on actuation thereof. An example of a power supply that may supply power to the device 224 is a primary power supply 228 such as an electrical grid to which the device 224 is connected, and/or a transformer which connects the electrical grid to the device 224. Another example of a power supply that may supply power to the device 224 is a backup and/or secondary power supply 230 such as a battery or power generator located within or proximate to a building in which the devices 202-218 are disposed and which supplies power to the devices 202-218 through the device 224 but not to other structures on a power company's electrical grid. It is to be understood that the device 224 and power supply 230 may both also communicate over the network 200, and in some embodiments the power supply 228 may communicate over the network 200 as well.

FIG. 2 also shows at least one electrically controllable switch 232 that may be included along one or more of the power lines between the device 224 and devices 202-218.

Additionally or alternatively, the switch 232 may be disposed at any one of the devices 202-218, 224. The switch 232 may be actuated to complete a path for power to travel from the supply 228 or supply 230 through the device 224 to one of the devices 202-218 in accordance with present principles. The switch 232 may also be actuated to break the path.

Figure 3:
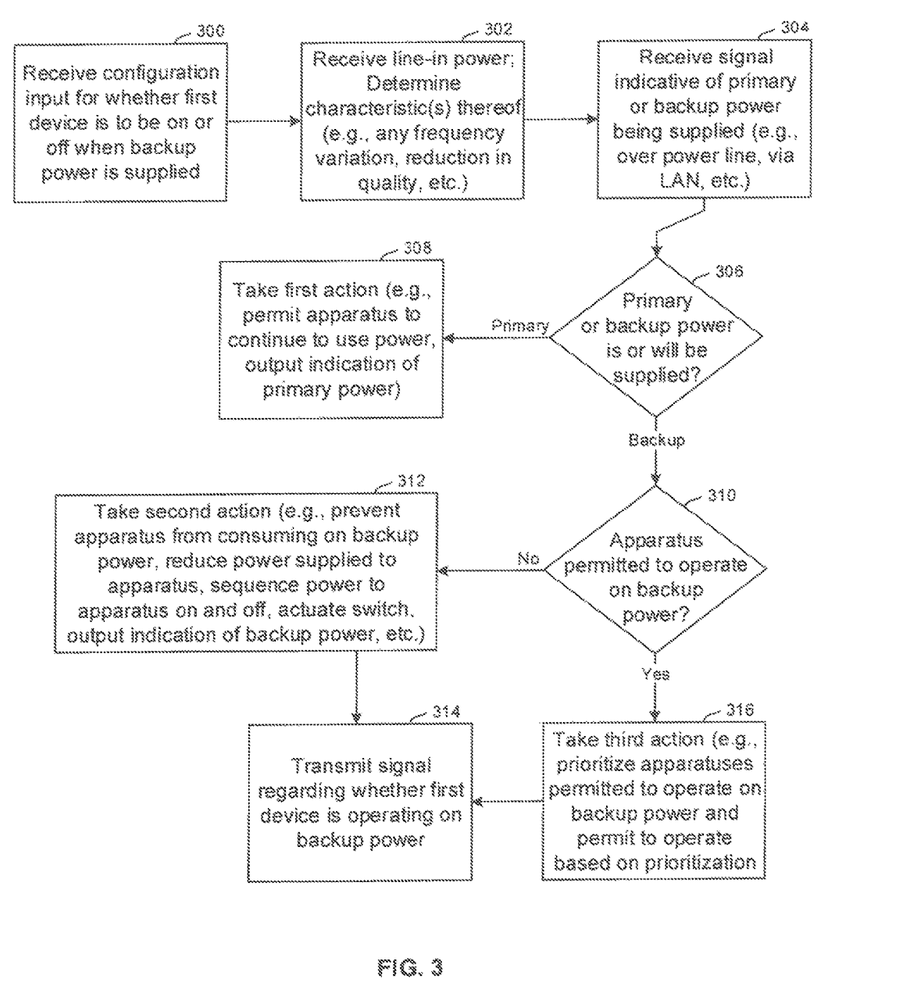
FIGS. 3 and 4 are flow charts of example algorithms in accordance with present principles.

Referring to FIG. 3, it shows example logic that may be executed by a device (referred to when describing FIG. 3 as the "first device") such as the system 100 to determine whether primary or backup power is being supplied, and to accordingly determine one or more actions to take. The first device may be a smart outlet, an appliance or other apparatus connected thereto, a coordinating device in an Internet of things environment that communicates with and controls other devices in the environment, a circuit breaker box, etc.

Beginning at block 300, the logic may receive configuration input for whether the first device is to have power provided thereto while backup power is available from a backup power supply/source, but not primary power from a primary power supply/source. The input may be received, for instance, from a user based on input detected at a user interface (UI) such as the UI 700 to be discussed below in reference to FIG. 7.

A primary power supply in accordance with present principles may be the primary source of power for the first device and/or a location at which the first device is disposed, such as may be received via a transformer from an electrical grid operated by an public utilities company. A backup and/or secondary power supply in accordance with present principles may be a power supply that does not typically provide power when a primary power supply is available to provide power, but that supplies power in the event that the primary power supply is unavailable. Examples of a backup/secondary power supply include a battery, a generator, or another local power source located within or proximate to a building in which the first device disposed that provides power to that building but not to other buildings and locations connected to the electrical grid.

From block 300, the logic of FIG. 3 may proceed to block 302 where the logic may receive power from a power supply. In some embodiments and also at block 302, the logic may determine one or more characteristics of the power that is received. The characteristics may be determined using a power management interface such as the interface 161 described above, using a controller and current analyzer located in a battery pack or power module of the first device, using a "smart outlet" in embodiments where the first device is embodied in a computerized, communication-enabled power outlet, etc. Characteristics that may be determined include frequency and frequency variations, as well as quality, amplitude, and/or transmission rate.

From block 302 the logic may next proceed to block 304. At block 304 the logic may receive one or more signals indicative of primary or backup power being supplied. The signals may be transmitted from a power company or utilities provider operating an electrical grid supplying primary power to the first device. If transmitted from a primary power supplier, the signals may be indicative of primary power being supplied or of primary power about to cease being supplied.

The signals may also be transmitted from a backup power supply such as those described above while supplying backup power to the first device, or from another device coordinating and managing power distribution within a building or network to which the first device is connected. For example, in an Internet of things system, a coordinating device, power regulation device, and/or power management device may transmit the signal. A smart circuit breaker box may also provide the signal.

The signals themselves may be received at the first device in a number of ways. For instance, they may be received over a wired communication medium such as an Ethernet cord. They may be received through power lines running to the first device using power-line communication protocols to transmit the signal(s), such as the X10 communication protocol. Still further, they may be received over a communication network such as the Internet, a Wi-Fi network, a wired LAN, a Bluetooth network, a near field communication (NFC network), an Internet of things network, etc. using one or more respective interfaces on the first device for such communication.

The logic of FIG. 3 may then proceed from block 304 to decision diamond 306. At diamond 306 the logic may determine whether primary or backup power is being supplied, and/or whether primary or backup power will be supplied (both sometimes collectively referred to herein as "is being supplied" or "is supplying"). In some example embodiments, the determination(s) at diamond 306 may be made based on the characteristics determined at block 302 and/or on the signal(s) received at block 304. Characteristics of backup power that may be identified include a variance or change in frequency of power relative to that expected to be received from a primary power source, and/or existence of a power pseudo-sine wave, square wave, and/or step wave (where, for example, a "clean" sine wave would be expected from a primary power source). Backup power characteristics for a backup power supply may also include a lesser or reduced quality of power relative to power provided by a primary power supply.

Thus, for example, a determination at diamond 306 that a quality of power that is being received has been reduced in comparison to previously received power may lead to a determination that backup power is being used, while a variance in frequency may also lead to a determination that backup power is being used. As another example, if a break in power being supplied to the first device is detected and/or if power at all is being received (such as for at least a threshold period of time), this too may lead to a determination at diamond 306 that backup power is being supplied or will be supplied shortly. The absence of any one of the foregoing may be an example leading to a determination at diamond 306 that primary power is being supplied.

As another example, signals may be received indicating primary power is being or will be supplied, which may lead to a determination of primary power at diamond 306. Signals may also be received indicating that primary power is about to cease being supplied, and/or that backup power is or will be supplied, which may lead to a determination of backup power at diamond 306.

As may be appreciated from FIG. 3, a determination that primary power is or will be supplied at diamond 306 may cause the logic to proceed to block 308, where the logic may take one or more first actions, swell as permitting the first device and/or another apparatus controlled by the first device (such as if the first device is a smart outlet) to continue to use power. Another example action that may be taken at block 308 may be to output an indication or notification that primary power is being used or supplied. The Indication may be output in the form of actuation of a light, such as actuation of an LED of a first predetermined color (e.g., green) at the first device, the apparatus, or another location such, as a display device or coordinating device in communication with the first device in an Internet of things environment. The indication may also be output as a notification presented on a display of one of those devices (an example of which will be described below in reference to FIG. 5), as an audio notification such as a predetermined chime or tone presented at one of those devices or an automated voice, and/or as a vibration or other haptic notification at one of those devices.

Still further, in some examples and also at block 308, the logic may transmit one or more signals to another device, such as a coordinating device in an Internet of things environment, indicating that the first device and/or associated apparatus are operating on primary power.

Referring back to diamond 306, a determination that backup power is or will be supplied at diamond 306 may cause the logic to instead proceed to decision diamond 310. At diamond 310 the logic may determine whether the first device or an apparatus controlled by the first device is permitted to operate on backup power. This determination may be made based on one or more settings configured by a user for whether the first device or apparatus controlled by it are to be permitted to operate on backup power. The determination may also be made based on administrator-configured settings, data from a power company or electrical grid indicating devices that are and are not allowed to operate on backup power, based on whether a button at the first device or the apparatus (such as the button 222 described above) has been set to a position configuring it to operate on or not operate on backup power, etc.

A negative determination at diamond 310 may cause the logic to proceed to block 312, where the logic may take one or more second actions, such as preventing the first device and/or the other apparatus controlled by the first device from operating or consuming backup power. Another example action that may be taken at block 312 may be to incrementally or gradually reduce power being supplied to the first device or apparatus to a lower level still above zero (such as if the device or apparatus is a light bulb, heater, or another device that establishes a resistive load). Other example second actions may be to sequence power to the first device or apparatus between on and off, such as using a pulse width modulation and/or an associated duty cycle, and to actuate a switch at the first device or elsewhere in the chain of power supply (such the switch 232 described above and/or a switch at the breaker box 224 described above) to cut off the supply of backup power to the first device or apparatus.

Yet another example action to be taken at block 312 may be to output an indication or notification that backup power is being used or supplied, or will be used or supplied. The indication may be output in the form of actuation of a light, such as actuation of an LED of a second predetermined color (e.g., red) at the first device, the apparatus, or another location such as a display device or coordinating device in communication with the first device in an Internet of things environment. The LED may also have its luminosity diminished relative to a luminosity level that may be output at block 308 if primary power is being supplied. Still further, the indication may be output as a notification presented on a display of one of those devices (an example of which will be described below in reference to FIG. 6), as an audio notification such as a predetermined chime or tone presented, at one of those devices or an automated voice, and/or as a vibration or other haptic notification at one of those devices.

From block 312 the logic may next proceed to block 314. At block 314 the logic may transmit one or more signals to another device, such as a coordinating device in an Internet of things environment, indicating that the first device and/or associated apparatus are operating on backup power.

Referring back to diamond 310, if instead an affirmative determination is made thereat, the logic may proceed from diamond 310 to block 316. At block 316 the logic may take one or more third actions, such as prioritizing apparatuses controlled by the first device that are permitted to operate on backup power and then permitting them to operate based on their prioritization and the amount of backup power available. For instance, some apparatuses may be given a higher priority than others, such as based on user input, data associated with each apparatus indicating a respective to a level of importance, etc. Apparatuses with higher priority may then be provided with available backup power before apparatuses of lower priority, and apparatuses of lower priority may be provided with backup power if and when it is available for them to use. As an example prioritization, a life support system may be tagged as having a highest priority, a refrigerator may be tagged as having a second highest priority, and an air conditioning unit may be tagged as having a lowest priority.

As another example, suppose that primary power has ceased being supplied, and there is a momentary lapse in the power supply before backup power is received, if three loads all have relatively large motors that are to be started up again when backup power is received (after having stopped when primary power ceased being supplied), these too may be prioritized so that but one motor starts back up at any given time so as to not over-draw on the backup power supply. Each one that is started hack up in turn may then continue to be powered using backup power while another of the three loads is started up. Once all three have been started back up, they may all simultaneously operate using backup power. The three loads may be sequenced at random, based on communication between the loads themselves, or based on a predefined prioritization as may have been set by a user or system administrator.

From bock 316 the logic may then proceed to block 314 and transmit a signal as described above. Although not shown in FIG. 3 for clarity, it is to be understood that after block 314 the logic may end or may revert back to an earlier point such as block 302 or block 304 and continue therefrom.

Before moving on to the description of other figures, it is to be understood that various steps of the logic disclosed herein may be performed in an order out of sequence to that specifically described above and that not all steps will be performed in all embodiments. For instance, a determination of backup power at diamond 306 may cause the logic to proceed directly to block 312 or 316.

Also note that determining whether primary or backup power is or will be supplied may be done continuously, or regularly at periodic intervals. Accordingly, in effect state logic may be used in some embodiments, although for convenience of description the logic of FIG. 3 is illustrated in flow chart format.

Figure 4:
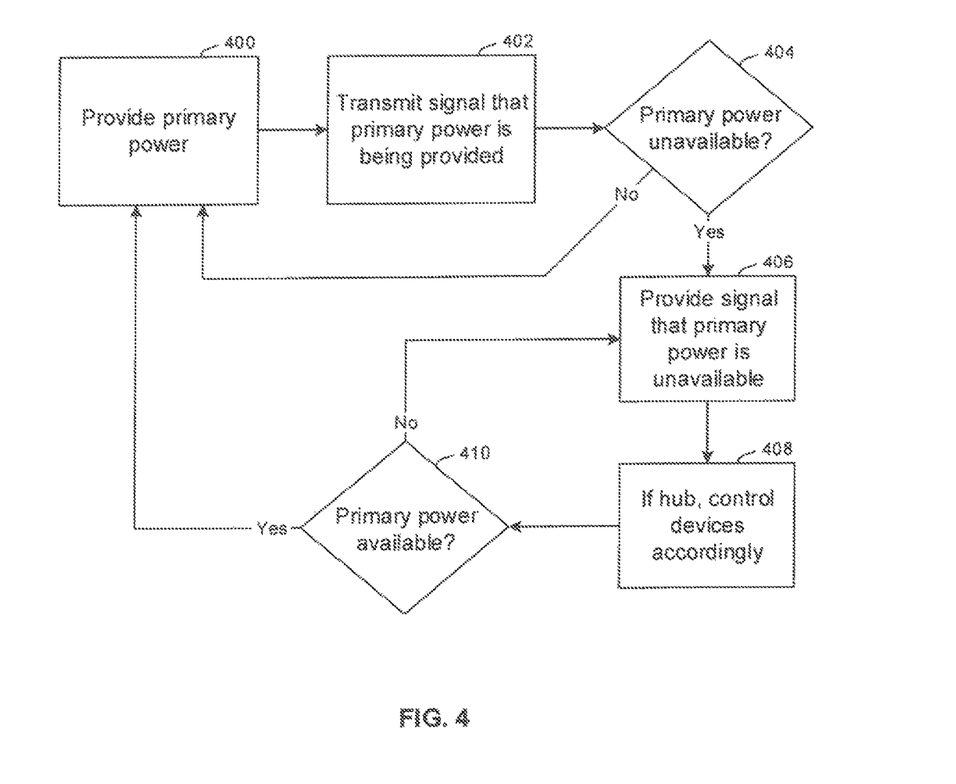

Continuing the detailed description in reference to FIG. 4, it shows example logic that may be executed by a device when providing one of primary or backup power to other devices in accordance with present principles (referred to when describing FIG. 4 as the "second device"). Thus, the second device may be a computer operated by a power company or utilities provider operating an electrical grid, by another primary power supply, or by a backup power supply or controller thereof, such as a smart generator. For convenience, FIG. 4 will be described in reference to primary power and assuming that the logic shown therein is executed by a primary power supply device, but it is to be understood, that a backup power supply may execute at least some of the logic of FIG. 4 (such as providing a signal that backup power is being provided). Notwithstanding, it is to be further understood that the logic of FIG. 4 may be executed by a coordinating device (referred to as a "hub" on the face of FIG. 4) in an Internet of things environment, a circuit breaker box, or another device configured to undertake present principles.

The logic of FIG. 4 begins at block 400, where the logic may provide, or facilitates the providing of, primary power to one or more other devices, appliances, apparatuses, etc. The logic may then proceed to block 402 where the logic may transmit a signal that primary power is being provided as described herein. Thus, for example, the signal may be transmitted over an Internet of things network, or over one or more power lines to the apparatuses receiving primary power using a power-line communication protocol.

From block 402 the logic may nest proceed to decision diamond 404, where the logic may determine if primary power is unavailable, such as using one of the methods described herein, and/or based on a detected primary power outage or receipt of data indicating the primary power outage. A negative determination at diamond 404 may cause the logic to revert back to block 400 and proceed therefrom.

However, an affirmative determination at diamond 404 may instead cause the logic to proceed to block 406. At block 406 the logic may provide a signal that primary power is unavailable as described herein. Thereafter, the logic may continue to block 408 where, if the logic is being executed by a coordinating device, or even a power supply or another device, devices that are controllable by the second device may be controlled accordingly, such as by limiting power provided thereto or causing power to cease being provided thereto.

From block 408 the logic may move to decision diamond 410. At diamond 410 the logic may determine whether primary power is available. A negative determination at diamond 410 may cause the logic to revert back to block 406 and proceed therefrom, while an affirmative determination at diamond 410 may instead cause the logic to revert back to block 400 and proceed therefrom.

Figure 5:
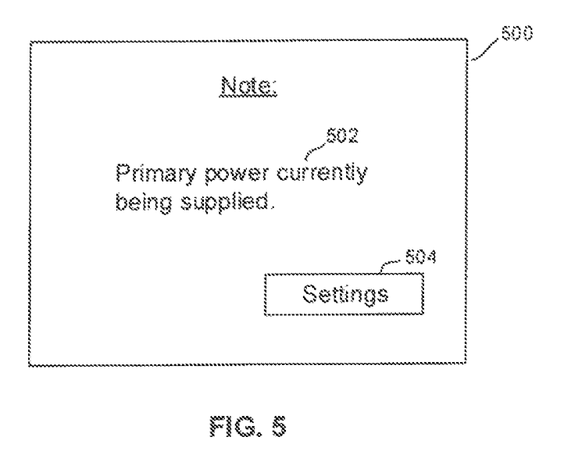
FIGS. 5-7 are example user interfaces (UIs) in accordance with present principles.

FIG. 5 shows an example user interface (UI) 500 that may be presented on a display in accordance with present principles. The UI 500 may include an indication 502 that primary power is currently being supplied to a device to which the indication 502 pertains. The UI 500 may also include a selector 504 that is selectable to automatically cause the UI 700 of FIG. 7 to be presented, which will be described below.

Figure 6:
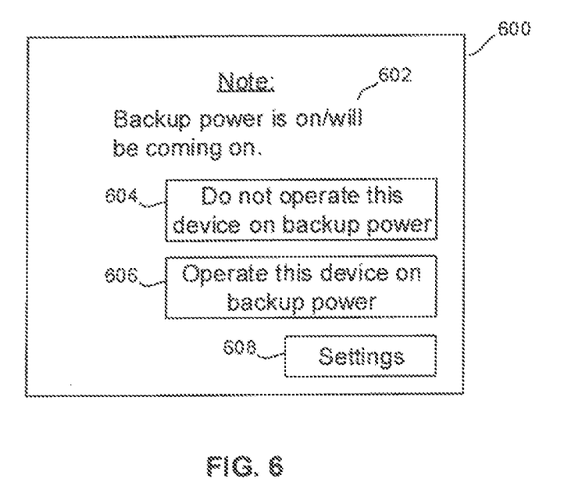

However, reference is first made to FIG. 6. FIG. 6 shows an example UI 600 that may be presented on a display in accordance with present principles. The UI 600 may include an indication 602 that backup power is currently being supplied and/or will be supplied to a device to which the indication 602 pertains. The UI 600 may also include a selector 604 that is selectable to provide input that the device to which the indication 602 pertains (e.g., the device that would otherwise be powered by the backup power) is to not operate using backup power. Accordingly, selection of selector 604 may automatically without further user input configure this device to not operate using backup power.

The UI 600 may also include a selector 606 that is selectable to provide input that the device to which the indication 602 pertains (e.g., the device that would otherwise be powered by the backup power) is to operate using backup power. Accordingly, selection of selector 606 may automatically without further user input configure this device to operate using backup power. Last, the UI 600 may also include a selector 604 that is selectable to automatically cause the UI 700 of FIG. 7 to be presented, which will now be described.

Figure 7:
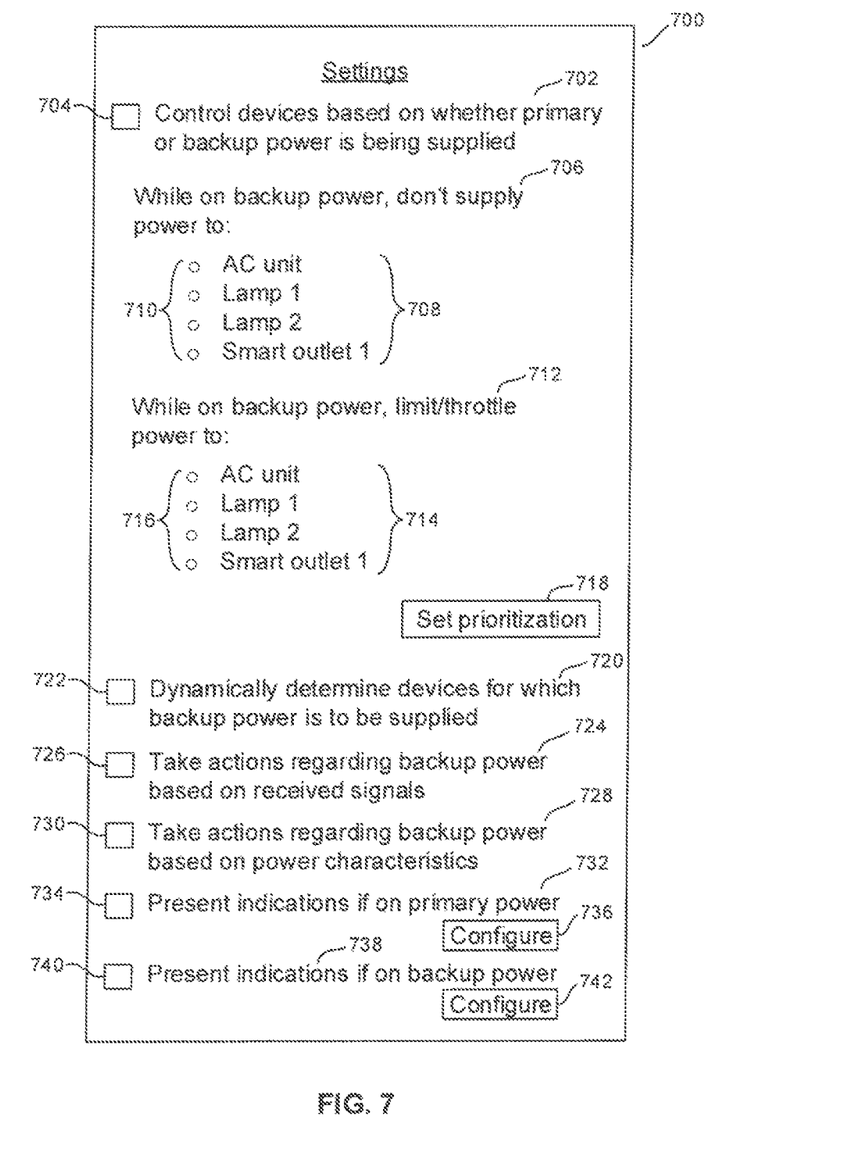

The UI 700 may be presented on a display for configuring settings relating to primary and backup power consumption in accordance with present principles. The UI 700 may include a first setting 702 enableable using check box 704 for devices in a network of devices (e.g., an Internet of things network) in accordance with present principles to be powered or not based on whether primary or backup power is available and/or being supplied as disclosed herein.

A setting 706 is also shown in the UI 700 for configuring one or more listed devices 708 (selectable using respective radio buttons 710) to not operate on backup power. Thus, selection of one or more of the listed devices 708 may configure those devices to not operate on backup power, and/or may configure other devices controlling them to not permit the selected devices to operate on backup power.

FIG. 7 may also include setting 712 for configuring one or more listed devices 714 (selectable using respective radio buttons 716) to have their power consumption limited, throttled, reduced, sequenced between on and off using a duty cycle, etc. Thus, selection of one or more of the listed devices 714 may configure those devices to have their power consumption limited, throttled, reduced, or sequenced between on and off accordingly, and/or may configure other devices controlling them to have the power consumption of the selected devices limited, throttled, reduced, or sequenced between on and off.

The UI 700 may also include a selector 718. The selector 718 may be selectable to automatically cause another UI to be presented at which a prioritization of the listed devices 714, and/or another set of devices, may be established for use in accordance with present principles.

The UI 700 of FIG. 7 may also include a setting 720 (enableable using check box 722) to enable dynamic determination of devices for which backup power is to be supplied. For example, dynamic determination may be based on changing standards provided by a power company. Dynamic determination may also be based on time of day usage patterns and other usage patterns for which devices are likely to be used or needed and when (and hence which devices to prioritize higher for receiving backup power).

Another setting 724 is also shown and is enableable using check box 726. Setting 724 may be enabled to configure a device or system undertaking present principles to take actions as described herein based on receipt of signals indicating that primary power or backup power is being supplied, such as may be received at block 304 of FIG. 3.

A setting 728 may also be presented on the UI 700 and be enabled using check box 730. Setting 728 may be enabled for a device or system undertaking present principles to take actions as described herein based on characteristics of power being received, such as may be performed at block 302 of FIG. 3.

FIG. 7 also shows a setting 732 that may be enabled using check box 734 for a device or system undertaking present principles to present indications as described herein at respective devices (and/or elsewhere) of those devices operating on primary power when they are operating on primary power. A selector 736 may also be presented that is selectable to cause another UI to be presented at which one or more types of indications to present for operating on primary power may be selected.

The UI 700 may also include a setting 738 that may be enabled using check box 740 for a device or system undertaking present principles to present indications in accordance with present principles at respective devices (and/or elsewhere) of those devices operating on backup power when they are operating on backup power. A selector 742 may be presented that is selectable to cause another UI to be presented at which one or more types of indications to present for operating on backup power may be selected.

It may now be appreciated that, using present principles, outlets, lights, air conditioning units, televisions, washers and dryers, etc. could be set to disabled if backup power or non-primary power is detected. For at least some of these devices or appliances, when they detect initial line-power, they may use a relatively small, amount of power to detect the source or nature of the power (e.g., primary or backup), and based on that decision they may power on fully if permitted based on their respective settings.

For smart outlets, when power is supplied to them, they may detect the origin of the power before sending power to any devices plugged into them. Each plug in an outlet may even be set or configured independently of other plugs for the same outlet so that, for example, one plug may be configured to provide backup power while another plug may not. Furthermore, in at least some embodiments, such as where a battery establishes a backup power supply, other devices may constantly detect the source of the power. In some embodiments, a smart outlet may even be configured to identify a type of load that's being drawn from it (such as a heavily inductive load, a cycling load, a straight resistive load, etc.) and other parameters such as impedance, power factors, duty cycles, etc., and make a presumption about what type of device is drawing the load. The smart outlet may then determine whether the system can shed the load while on backup power based on the device type and/or a prioritization of device types.

Moreover, present principles may be applied to smart circuit breakers as well. For instance, smart circuit breakers in a circuit breaker box may be configured to pass backup power through them or not based on devices to which they are electrically coupled either being set or not set for consuming backup power, respectively.

In addition to the UIs described above, an interface may also be presented on a display that lists how much power is typically consumed (e.g., on average) by which devices, outlets, etc. This interface may also indicate the capabilities of a backup power supply and indicate that at feast some of the devices, outlets, etc. should be configured to not receive backup power based on the capabilities of the backup power supply. The interface may thus further include selectable options for such configurations.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein.

What is claimed is:

1. A device, comprising:
   at least one processor;
   storage accessible to the at least one processor and bearing instructions executable by the at least one processor to:
   determine that power from a secondary power source at least one of is being received and will be received at least in part based on identification of at least one characteristic of power that is received, the secondary power source being a power source that is external to the device;
   responsive to the determination that power from the secondary power source at least one of is being received and will be received, perform a first action regarding operating an apparatus using the secondary power source;
   determine that power from a primary power source at least one of is being received and will be received, the determination that power from the primary power source at least one of is being received and will be received being based at least in part identification of a sine wave; and
   responsive to the determination that power from the primary power source at least one of is being received and will be received, perform a second action regarding operating the apparatus using the primary power source.

2. The device of claim 1, herein the instructions are executable by the at least one processor to:
   determine that power from the secondary power source at least one of is being received and will be received at least in part based on at least one signal that is received at the device, wherein the signal is received via a power line using a power line communication protocol.

3. The device of claim 1, wherein the instructions are executable by the at least one processor to:
   determine that power from the secondary power source at least one of is being received and will be received at least in part based on at least one signal that is received at the device, wherein the signal is received via a wireless local area network (LAN).

4. The device of claim 1, wherein the at least one characteristic comprises a frequency variation.

5. The device of claim 1, wherein power from the secondary power source comprises power from a generator.

6. The device of claim 1, wherein the first action comprises outputting an indication, via a light source, that secondary power is being supplied.

7. The device of claim 1, wherein the first action comprises making a determination regarding whether the apparatus is permitted to operate on secondary power.

8. The device of claim 7, wherein the instructions are executable by the at least one processor to:
   responsive to a determination that the apparatus is not permitted to operate on secondary power, take a third action to prevent the apparatus from consuming power.

9. The device of claim 1, wherein the first action comprises determining which of plural apparatuses to operate on secondary power based at least in part on a prioritization.

10. The device of claim 1, wherein the first action comprises sequencing power supplied to the apparatus between on and off.

11. The device of claim 1, wherein the second action comprises outputting an indication, via a light source, that primary power is being supplied.

12. The device of claim 1, wherein the at least one characteristic comprises a reduction in quality of power that is received at the device.

13. The device of claim 1, wherein the at least one characteristic comprises a particular frequency of power that is received at the device.

14. The device of claim 1, wherein the at least one characteristic comprises a particular amplitude of power that is received at the device.

15. The device of claim 1, wherein the at least one characteristic comprises a particular transmission rate for power that is received at the device.

16. The device of claim 1, wherein the at least one characteristic relates to existence of a pseudo-sine wave.

17. The device of claim 1, wherein the at least one characteristic relates to existence of a square wave.

18. The device of claim 1, wherein the at least one characteristic relates to existence of a step wave.

19. A method, comprising:
determining, at a device, that power from a secondary power source at least one of is being received and will be received at least in part based on identification of at least one characteristic of power that is being supplied, the secondary power source being a power source that is disposed at a different location than the device;
performing, at the device and responsive to the determining that power from the secondary power source at least one of is being received and will be received, a first action regarding operating an apparatus using the secondary power source;
determining, at the device, that power from a primary power source at least one of is being received and will be received, the determining that power from the primary power source at least one of is being received and will be received being based at least in part identifying a sine wave; and
performing, responsive to the determination that power from the primary power source at, least one of is being received and will be received, a second action regarding operating the apparatus using the primary power source.

20. The method of claim 19, wherein power from the secondary power source comprises power from a generator.

21. The method of claim 19, wherein the first action comprises sequencing power supplied to the apparatus between on and off.

22. The method of claim 19, wherein the at least one characteristic comprises one or more of: a change in frequency of power that is received at the device, a reduction in quality of power that is received at the device, a particular frequency of power that is received at the device, a particular amplitude of power that is received at the device, and a particular transmission rate for power that is received at the device.

23. The method of claim 19, wherein the at least one characteristic relates to one or more of: existence of a pseudo-sine wave, existence of a square wave, and existence of a step wave.

24. A computer readable storage medium (CRSM) that is not a transitory signal and not a signal per se, the computer readable storage medium comprising instructions executable by at least one processor of a device to:
determine that power from a secondary power source at least one of is being received and will be received based at least in part on identification of at least one characteristic of power that is being supplied, the secondary power source being a power source that is external to an appliance;
responsive to the determination that power from the secondary power source at least one of is being received and will be received, perform a first action;
determine that power from a primary power source at least one of is being received and will be received, the determination that power from the primary power source at least one of is being received and will be received being based at least in part identification of a sine wave; and
responsive to the determination that power from the primary power source at least one of is being received and will be received, perform a second action.

25. The CRSM of claim 24, wherein the at least one characteristic comprises one or more of: a change in frequency of power that is received at the device, a reduction in quality of power that is received at the device, a particular frequency of power that is received at the device, a particular amplitude of power that is received at the device, a particular transmission rate for power that is received at the device.

26. The CRSM of claim 24, wherein the at least one characteristic relates to one or more of: existence of a pseudo-sine wave, existence of a square wave, and existence of a step wave.

* * * * *